United States Patent
Sharivker et al.

(10) Patent No.: US 8,931,983 B2
(45) Date of Patent: Jan. 13, 2015

(54) MILLING TOOL ASSEMBLY HAVING A REPLACEABLE CUTTER

(75) Inventors: Leonid B. Sharivker, Nahariya (IL); Sergei V. Boulakhov, Nahariya (IL); Vladimir Galipko, Nahariya (IL); Vladimir D. Volokh, Maalot (IL); Shay Zeidner, Nahariya (IL)

(73) Assignee: Kennametal Inc., Latrobe, PA (US)

( * ) Notice: Subject to any disclaimer, the term of this patent is extended or adjusted under 35 U.S.C. 154(b) by 890 days.

(21) Appl. No.: 12/989,925

(22) PCT Filed: May 6, 2009
(Under 37 CFR 1.47)

(86) PCT No.: PCT/US2009/042942
§ 371 (c)(1),
(2), (4) Date: Jun. 30, 2011

(87) PCT Pub. No.: WO2009/140109
PCT Pub. Date: Nov. 19, 2009

(65) Prior Publication Data
US 2012/0009027 A1    Jan. 12, 2012

(30) Foreign Application Priority Data
May 11, 2008    (IL) .......................................... 191330

(51) Int. Cl.
*B23B 31/11* (2006.01)
*B23C 5/10* (2006.01)
*B23B 31/10* (2006.01)

(52) U.S. Cl.
CPC . *B23C 5/10* (2013.01); *B23B 31/11* (2013.01); *B23B 2231/0204* (2013.01); *B23B 2251/02* (2013.01); *B23C 2210/02* (2013.01); *B23C 2250/12* (2013.01)
USPC .......................................... 408/233; 408/143

(58) Field of Classification Search
USPC .................................................. 408/143, 233
See application file for complete search history.

(56) References Cited

U.S. PATENT DOCUMENTS

| | | |
|---|---|---|
| 4,850,759 A | 7/1989 | Strand et al. |
| 5,114,286 A | 5/1992 | Calkins |
| 5,593,258 A * | 1/1997 | Matsumoto et al. .......... 409/234 |
| 6,280,126 B1 * | 8/2001 | Slocum et al. ................ 409/141 |
| 6,485,220 B2 | 11/2002 | Hecht |
| 7,329,073 B2 | 2/2008 | Jonsson et al. |
| 2006/0280571 A1 | 12/2006 | Kawai et al. |
| 2007/0011653 A1 | 1/2007 | Fischer et al. |
| 2009/0010709 A1 * | 1/2009 | Berglow et al. ............... 403/343 |
| 2009/0142150 A1 * | 6/2009 | Chu .............................. 408/59 |

FOREIGN PATENT DOCUMENTS

| | | |
|---|---|---|
| EP | 0934788 B1 | 8/1999 |
| JP | 62157708 | 7/1987 |
| JP | 3812475 B2 | 8/2006 |
| KR | 200366697 Y1 | 11/2004 |

* cited by examiner

*Primary Examiner* — Will Fridie, Jr.
(74) *Attorney, Agent, or Firm* — Larry R. Meenan, Esq.

(57) ABSTRACT

A milling tool assembly has a replaceable cutter and a reusable shank connected to the cutter with a detachable joint. The joint may be, for example, a threaded connection. An intermediate alignment sleeve made of an elastic or semi-elastic material, is positioned between the cutter and the shank about the axis of rotation of the shank.

18 Claims, 5 Drawing Sheets

MILLING TOOL ASSEMBLY HAVING A
REPLACEABLE CUTTER

FIELD OF THE INVENTION

The present invention relates to a milling tool assembly, and in particular to the joint of a replaceable round tip to a reusable shank, by means of a partially elastic energy absorbing joint.

BACKGROUND OF THE INVENTION

Historically, end mills for metal cutting machinery were produced as a single unit, comprising a fluted cutting portion and a cylindrical or conical shank portion sized to fit a machine spindle. However the increasing global pricing of modern tool alloys along with recently developed intricate surface treatment, made it less economical, as the expensive shank material was wasted. It is therefore became common practice to produce a separate cutter made of high quality alloy or sintered carbide, which is then concentrically attached to the end of a reusable steel shank.

It is highly desirable that the cutter be easily replaced, upon wear, while leaving the shank in the machine spindle, such that no further adjustments are required after cutter replacement. A major requirement related to such accurate milling applications is that each replacement cutter be repeatedly, accurately, centered to the true spindle axis of rotation and axially positioned correctly.

One basic method currently in use for joining the cutter to the shank is disclosed for example in U.S. Pat. No. 5,114,286, teaching an interchangeable cutting tool alignment and positioning system comprising a first tool segment having a male coupler and a second tool segment having a female coupler. The male coupler comprises a pilot in the form of first cylindrical mating surface, a concentric aligner in the form of second cylindrical mating surface spaced apart from the pilot, a male thread extending between the pilot and the concentric aligner and an axial stop in the form of planar surface. The female coupler comprises a pilot bore in the form of complementary cylindrical mating surface, corresponding to the cylindrical mating surface of the pilot, a concentric bore in the form of a complementary cylindrical mating surface corresponding to the cylindrical mating surface of the concentric aligner, a female thread extending between the pilot bore and the concentric bore, and an axial stop in the form of complementary planar surface.

The described pilot, concentric aligner, pilot bore and concentric bore, are necessary because the threaded coupler by its own is not sufficiently accurate for such repeated replacement of cutters.

Further improvements to the above basic concept are also known. For instance, U.S. Pat. No. 6,485,220 discloses a frustoconical radial alignment instead of a cylindrical alignment, as well as a strengthened thread root. U.S. Pat. No. 7,329,073 describes adjacent axial and radial stop surfaces, while US 2007/011653 discloses self centering multi-start thread.

Nevertheless all the above described solutions suffer from restrictive production requirements. Typical production tolerances of the cylindrical mating surfaces on the cutter and shank, sufficient for satisfying the need of replaceable cutters falling repeatedly in the desired range of concentricity and axis position, are less than 5 micrometers. Such close tolerances necessitate an additional grinding process.

Furthermore, sintered carbide cutters by their nature are very hard yet also very brittle. Direct coupling of the hard cutter to the steel shank imposes repeated vibration and shock on the cutter produced during the milling operation. If this shock is not properly absorbed, it will end with fracture and early failure of the tool.

Additionally, by virtue of fit tolerances i.e. the coincidence of mutually contacting parts, and their statistical dispersion, in some cases, there will be a gap of up to 10 micrometers between the shank bore and the cutter mating surface. The presence of such a gap, besides the resulting run-out itself, may also, when subjected to the afore-mentioned vibration, loosen the thread coupler during machine operation, typically a disastrous situation.

Consequently, an improved, quick-change joint for coupling a replaceable round tip to a reusable shank is required, that will eliminate the need of tight tolerances as well as absorb undesired vibration and shock while reducing the risk of fracture and unexpected joint slack.

SUMMARY OF THE INVENTION

The present invention provides a milling tool assembly utilizing an elastic energy absorbing joint for coupling a replaceable round tip to a reusable shank.

According to one embodiment of the present invention there is provided a milling tool assembly having a replaceable cutter and a reusable shank coupled via a detachable joint, said detachable joint comprising tightening means and an at least partially elastic, energy absorbing, intermediate alignment sleeve positioned between the cutter and the shank concentric with an axis of rotation of the tool.

The intermediate alignment sleeve can be a plain sleeve performing only on the radial direction, or according to a second embodiment, a flanged sleeve performing on both the radial and axial directions.

The wall thickness of the intermediate alignment sleeve and surrounding mating surfaces are provided with a tolerance chain that will always provide at least a minimal interference fit.

BRIEF DESCRIPTION OF THE DRAWINGS

The invention will now be described in connection with certain non-limiting embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of an embodiment according to the invention, showing the milling tool assembly;

FIG. 2 is an exploded view of the milling tool assembly shown in FIG. 1;

FIG. 3 is an exploded view showing the joint of the milling tool assembly in greater detail;

FIG. 4 is a partially sectioned plan view of the milling tool assembly of FIG. 1 showing the assembled joint;

FIG. 5 is a partially sectioned plan view of a milling tool assembly according to another embodiment showing a bidirectional energy absorbing sleeve; and, FIG. 6 is a cross-sectional view of a milling tool assembly according to another embodiment showing a corrugated energy absorbing sleeve.

FIG. 7 is a partially sectioned plan view of a milling tool assembly according to yet another embodiment.

DETAILED DESCRIPTION OF EMBODIMENTS

Figure 1:
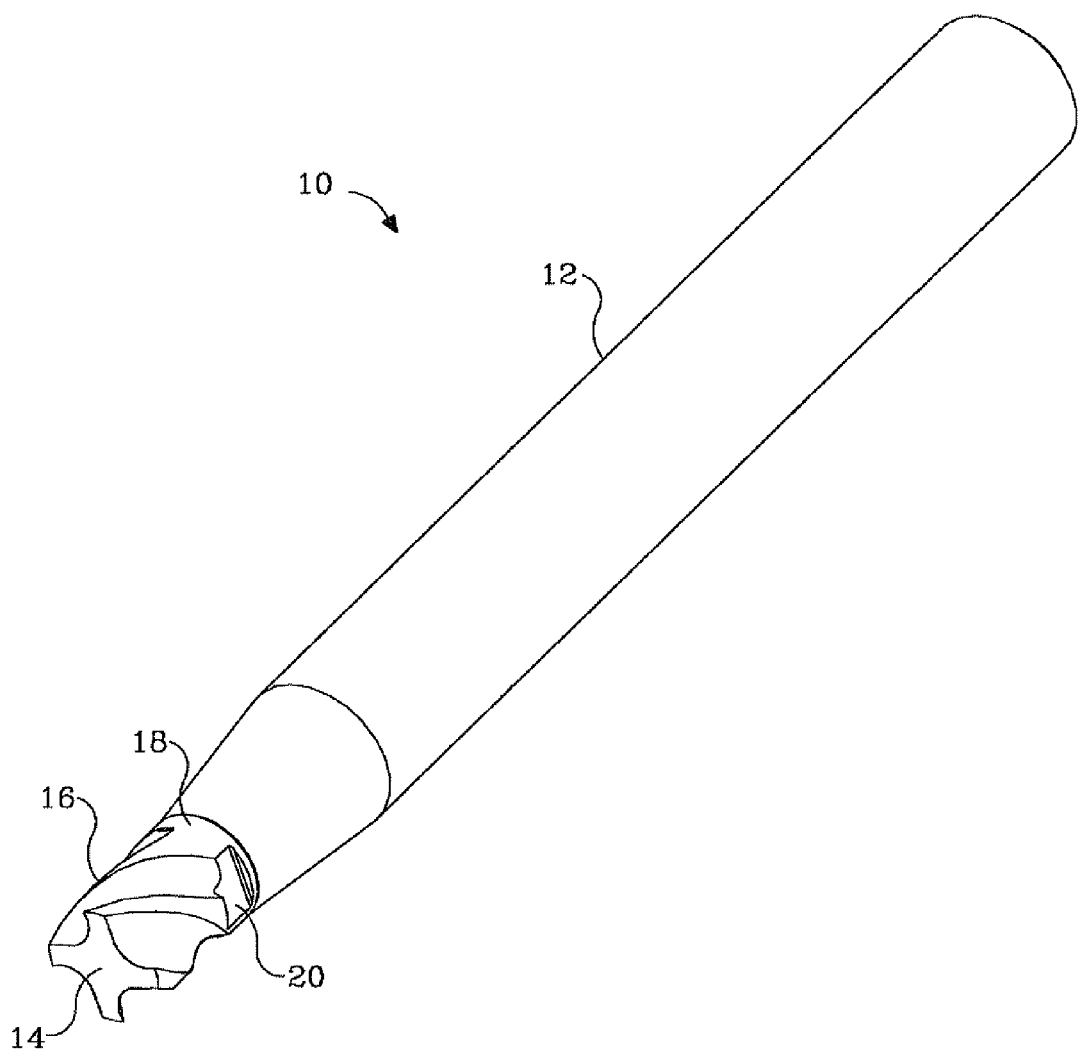

FIG. 1 shows a milling tool assembly generally referenced 10 according to a first embodiment of the invention, comprising a reusable shank 12 and replaceable cutter 14, coupled by a detachable joint. The visible portion of the cutter 14 may include an active fluted portion 16, followed by a short cylindrical portion 18. The cylindrical portion 18 is preferably equipped with at least two opposing parallel flats 20, on which a standard spanner may fit. The shank 12 is shown here cylindrical with a tapered portion, by way of example only, it being understood that other cross-sections and shapes are also possible. The cutter 14, shown here as an end mill may be replaced with a face mill, rounded tip mill, slitting mill, drill, reamer, or any other replaceable tip for milling, drilling, reaming or other metal cutting applications.

Figure 2:
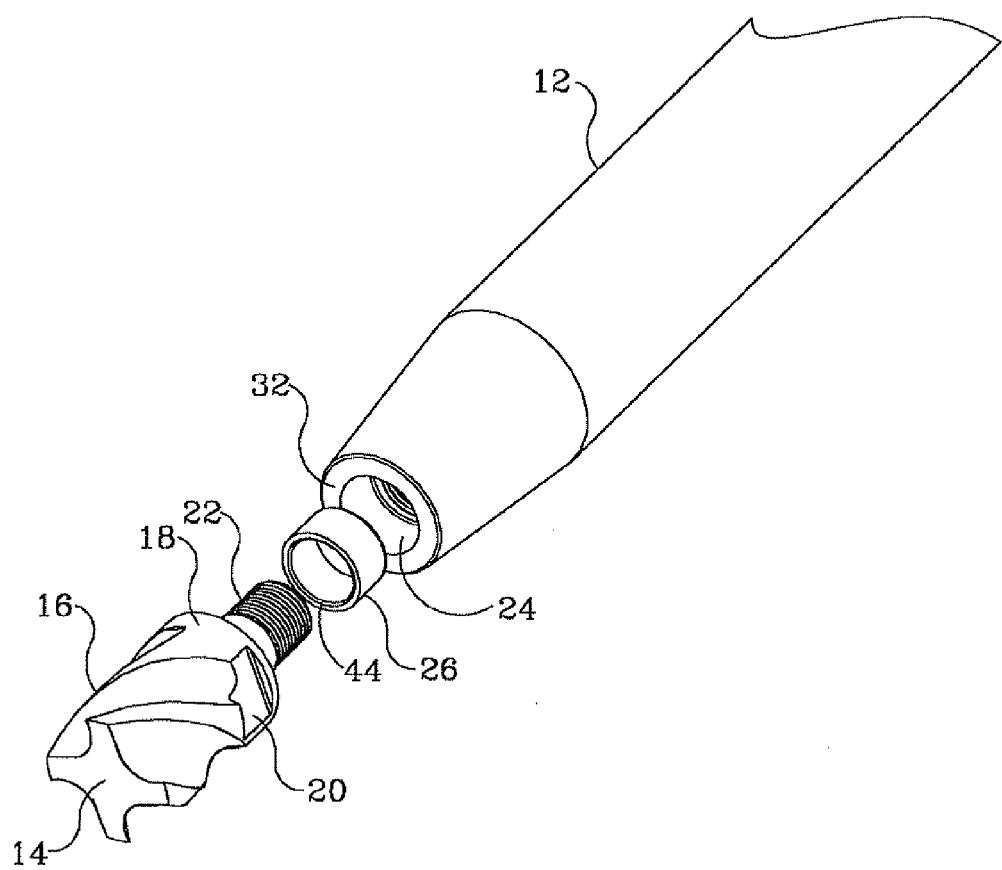
Figure 3:
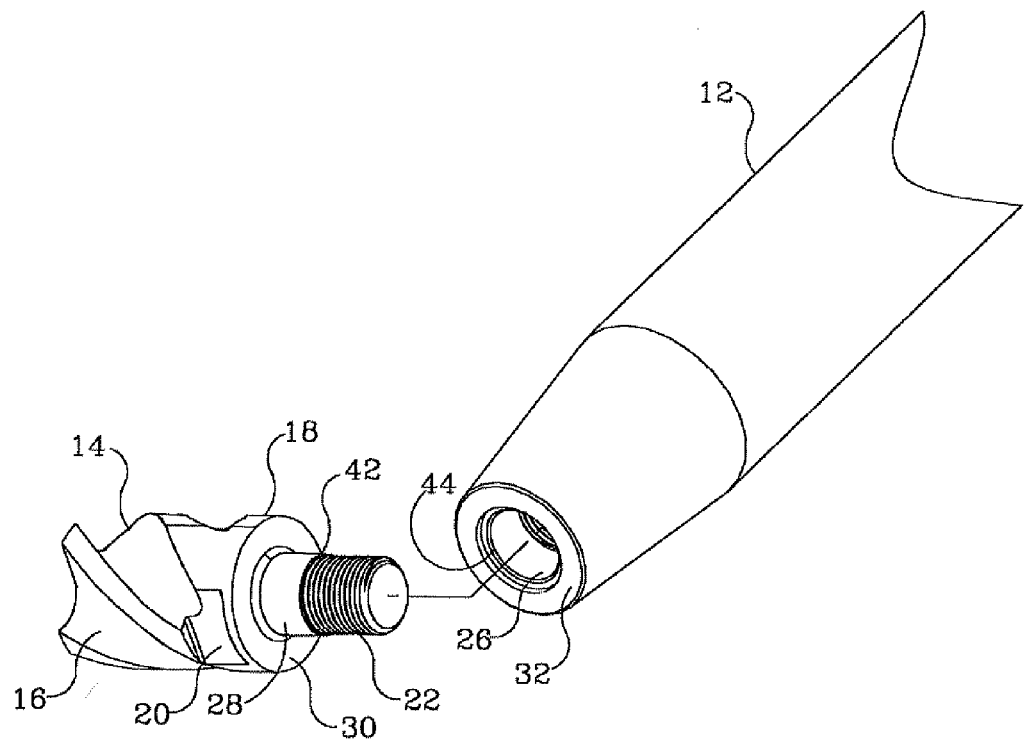

FIGS. 2 and 3 are exploded views of the milling tool assembly 10, revealing some details of the joint, such as an outwardly protruding threaded tail 22 of the cutter 14, an alignment bore 24 of the shank 12 concentric to its axis of rotation, and an intermediate alignment sleeve 26 preferably made of an elastic or semi-elastic energy absorbing material as described in greater detail below.

As shown in FIG. 3, the cutter 14 further includes a cylindrical radial aligner 28 concentric to the axis of rotation, extending between the short cylindrical portion 18 and the threaded tail 22. A flat axial stop shoulder 30 perpendicular to the axis of rotation bridges the gap between the smaller diameter, cylindrical radial aligner 28, and the larger diameter, short cylindrical portion 18. The shank 12 ends with an axial stop surface 32 perpendicular to the axis of rotation, and further includes toward a rear portion of the alignment bore 24 a narrower threaded bore 34 shown in FIG. 4. As also shown in FIG. 4, the shank 12 is preferably hollow 35, to allow for the flow of coolant through the tool assembly, when required.

Figure 4:
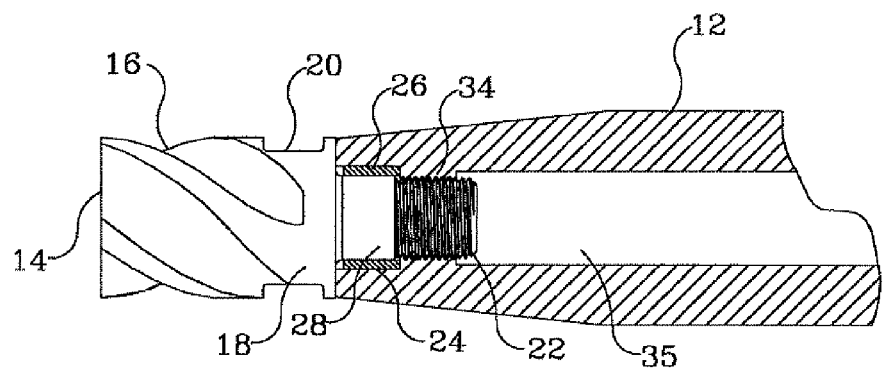

Assembly of the milling tool assembly 10 is performed by insertion of the inter-mediate alignment sleeve 26 into the alignment bore 24 of the shank 12, as shown in FIGS. 3 and 4, and engagement of the cutter's threaded tail 22 into the threaded bore 34 of the shank 12, until the axial stop shoulder 30 of the cutter 14 abuts the axial stop surface 32 of the shank 12. The joint is preferably tightened to a specified torque using a torque limiting wrench to avoid excessive tension of the cutter. A multi-start thread or bayonet half-turn joint, as well as pneumatic or hydraulic tensioner can be employed to provide faster tightening during cutter replacement.

As mentioned above, the intermediate alignment sleeve 26 is preferably made of an elastic or semi-elastic material that may accommodate interfering tolerances, yet permit easy assembly. Using such an elastic alignment sleeve provides two advantages. The first is elimination of the gap that would otherwise occur between the radial aligner and the alignment bore whose width is subject to variation according to their respective manufacturing tolerances as described above with reference to the prior art. The second advantage is increased resistance of the tool to vibration and shock due to the energy absorption properties of the intermediate alignment sleeve 26, thus reducing the risk of fracture and joint slack.

The first advantage is technically achieved by providing a tolerance chain that ensures at least a minimal interference fit. For example, with reference to ISO Standard 1101 defining "form and location tolerances", the production tolerance for the radial aligner 28 may be chosen to match class k5, defining for a given nominal dimension that the diameter will never be smaller than the nominal. In similar manner, the tolerance for the alignment bore 24 may be chosen for example to match class M6, defining for a given nominal dimension that the diameter will never be larger than the nominal. The alignment sleeve 26 will accept a wall thickness tolerance not permitting a wall thickness thinner than the nominal. Upon assembly of the tool, the intermediate alignment sleeve 26 will deform, owing to its elasticity, to fill the actual gap between the alignment bore 24 and the cylindrical radial aligner 28. It will be recognized by the person skilled in the art that the above combination of tolerances is relatively easy to achieve with common fabrication techniques, yet perfect concentricity is maintained over the entire tolerance range.

The material of which the elastic intermediate alignment ring 26 is made, may be any kind of plastic, preferably one that is able to withstand elevated temperatures as may be developed in the cutter. Suitable plastics for example may be chosen from the list of Fluoropolymers (Teflon), Polysulfone, Polyetheretherketone (PEEK), or even moderate temperature resistant plastics such as Polypropylene. The plastic may be reinforced with glass or carbon fibers in order to achieve better strength and energy absorption properties.

It will be recognized that such plastic sleeves particularly when produced by injection molding are very cheap in production and hence may be used only once, being disposed with the worn-out cutter. Accordingly a replacement cutter may be provided with a new sleeve, ensuring that the proper tolerance chain and shock absorption properties are repeatedly maintained.

With further reference to FIGS. 3 and 4, it is seen that the threaded tail 22 of the cutter 14 is longer than the cylindrical radial aligner 28, in order to ensure that the threaded tail 22 of the cutter 14 is correctly located in the threaded bore 34 of the shank 12, before entering the interference portion which imposes some additional tightening torque. The additional tightening torque contributes to prevention of undesired cutter slack during operation. The external edge 42 (FIG. 3) of the cylindrical radial aligner 28 and the internal edge 44 of the intermediate alignment ring 26, are rounded and smoothed to avoid damage to the intermediate alignment ring 26 during assembly.

Figure 5:
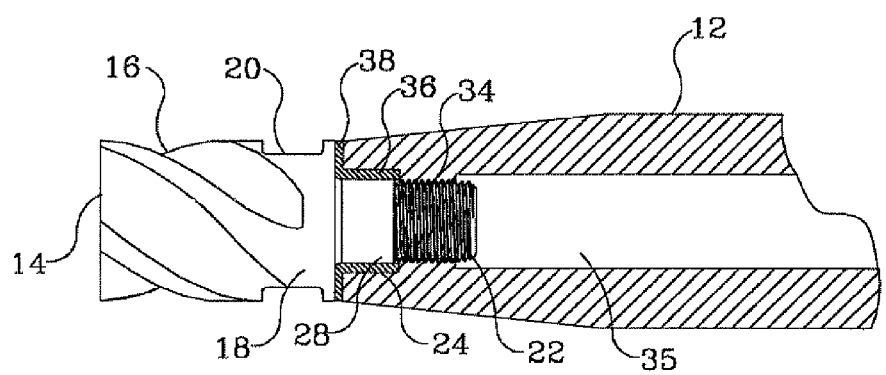

In the above-described embodiment, the intermediate alignment sleeve 26, being a plain sleeve, operates only in the radial direction, while the axial position is derived from the direct contact of stop shoulder 30 of the cutter 14 with the axial stop surface 32 of the shank 12. FIG. 5 shows a second embodiment where the intermediate alignment sleeve 36 is in the form of a flanged sleeve, such that the axial stop shoulder 30 of the cutter 14 does not make direct contact with the axial stop surface 32 of the shank 12, but rather the axial stop shoulder 30 and the axial stop surface 32 abut respective front and rear surfaces of the sleeve flange 38, providing vibration and shock absorption in both the axial and radial directions.

Figure 6:
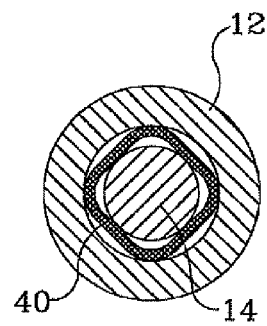

FIG. 6 shows yet a further embodiment where the longitudinal cross-section of the intermediate alignment sleeve 40 is in the form of a corrugated sleeve that may be made from metal, while preserving the elasticity of the plastic sleeves described above.

Figure 7:
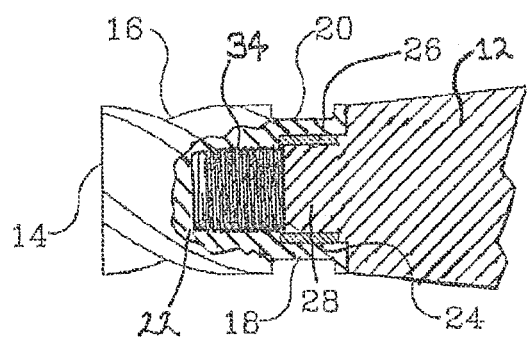

It will be understood that the invention contemplates any kind of elastic or semi-elastic shock absorbing sleeve intermediately positioned between a cutter and a shank of any shape or cross-section and in combination with any type of tightening means. Also, although in the embodiments as previously described in detail, the shank is provided with a threaded bore for engaging a complementary male thread on the cutter, the reverse arrangement from that previously described is also possible whereby the shank is provided with a protruding male threaded portion, a cylindrical radial aligner and a flat axial shoulder stop; and the cutter is provided with an alignment bore and an internally threaded bore, such as shown in FIG. 7.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be tip embraced therein.

What is claimed is:

1. A milling tool assembly comprising:
    a reusable shank;
    a replaceable cutter having an active fluted portion coupled to the shank via a detachable joint, the detachable joint comprising:
        a tightening means;
        an at least partially elastic, energy absorbing, intermediate alignment sleeve positioned between the cutter and the shank concentric with an axis of rotation of the tool;
        an alignment bore concentric to the axis of rotation defined in one of the shank and the cutter, the alignment bore bounded by an axial stop surface disposed perpendicular to the axis of rotation and a first portion of the tightening means disposed toward a rear portion of the alignment bore away from the axial stop portion;
        a tail outwardly protruding from an end surface of the other one of the shank and the cutter and having a second portion of the tightening means that is complementary to the first portion of the tightening means; and
        a cylindrical radial aligner disposed concentric with the axis of rotation of the tool and extending between the end surface of the other one of the shank and the cutter and the second portion of the tightening means,
        wherein the tightening means is of a longer axial length than the cylindrical radial aligner.

2. The assembly according to claim 1, wherein said intermediate alignment sleeve is a sleeve operative only in a radial direction.

3. The assembly according to claim 1, wherein said intermediate alignment sleeve is a flanged sleeve operative in both radial and axial directions.

4. The assembly according to claim 1, wherein the cutter further includes a short cylindrical portion adjoining the active fluted portion, said short cylindrical portion being equipped with at least two opposing parallel flats dimensioned for engaging a standard spanner.

5. A milling tool assembly having a replaceable cutter and a reusable shank coupled via a detachable joint, said detachable joint comprising an at least partially elastic, energy absorbing, intermediate alignment sleeve positioned between the cutter and the shank concentric with an axis of rotation of the tool,
    wherein the detachable joint further comprises: an alignment bore in the shank concentric to the axis of rotation having an axial stop surface perpendicular to the axis of rotation and a threaded bore toward a rear portion of the alignment bore, and a threaded tail outwardly protruding from an end surface of the cutter and having a thread that is complementary to that of the threaded bore in the shank,
    wherein the cutter further includes a cylindrical radial aligner concentric with the axis of rotation of the tool and extending between a short cylindrical portion and the threaded tail, and a flat axial stop shoulder perpendicular to the axis of rotation bridging the gap between the smaller diameter, cylindrical radial aligner and the larger diameter, short cylindrical portion, and
    wherein the threaded tail of the cutter is longer than the cylindrical radial aligner.

6. A milling tool assembly having a replaceable cutter and a reusable shank coupled via a detachable joint, said detachable joint comprising an at least partially elastic, energy absorbing, intermediate alignment sleeve positioned between the cutter and the shank concentric with an axis of rotation of the tool,
    wherein the detachable joint further comprises: an alignment bore in the cutter concentric to the axis of rotation having an axial stop surface perpendicular to the axis of rotation and a threaded bore toward a rear portion of the alignment bore, and a threaded tail outwardly protruding from an end surface of the shank and having a thread that is complementary to that of the threaded bore in the cutter,
    wherein the shank further includes a cylindrical radial aligner concentric with the axis of rotation of the tool and extending between the end surface of the shank and the threaded tail, and a flat axial stop shoulder perpendicular to the axis of rotation bridging the gap between the smaller diameter, cylindrical radial aligner and the larger diameter, short cylindrical portion, and
    wherein the threaded tail of the shank is longer than the cylindrical radial aligner.

7. The assembly according to claim 1, wherein dimensions of the alignment bore, the cylindrical radial aligner and the intermediate alignment sleeve are provided with tolerance chain that ensures at least a minimal interference fit.

8. The assembly according to claim 5, wherein the external edge of the cylindrical radial aligner and the internal edge of the intermediate alignment sleeve are rounded and smoothed.

9. The assembly according to claim 6, wherein the external edge of the cylindrical radial aligner and the internal edge of the intermediate alignment sleeve are rounded and smoothed.

10. The assembly according to claim 1, wherein the intermediate alignment sleeve is made of a plastic material.

11. The assembly according to claim 10, wherein said plastic material is chosen from the group of: Fluoropolymers, Polysulfone, Polyetheretherketone, and Polypropylene.

12. The assembly according to claim 10, wherein the plastic material is reinforced with glass or carbon fibers in order to improve its strength and energy absorption properties.

13. The assembly according to claim 10, wherein the intermediate alignment sleeve is injection molded.

14. The assembly according to claim 1, wherein the intermediate alignment sleeve is in the form of a corrugated sleeve.

15. The assembly according to claim 14, wherein the corrugated sleeve is formed of metal.

16. The milling tool assembly of claim 1, wherein the first portion of the tightening means comprises a female threaded portion and the second portion of the tightening means comprises a male threaded portion.

17. A replaceable cutter structured to be coupled to a replaceable shank as recited in claim 1 for forming a milling tool assembly as recited in claim 1.

18. The replaceable cutter according to claim 17, further comprising a replacement intermediate alignment sleeve.

* * * * *